Figures 1, 2:
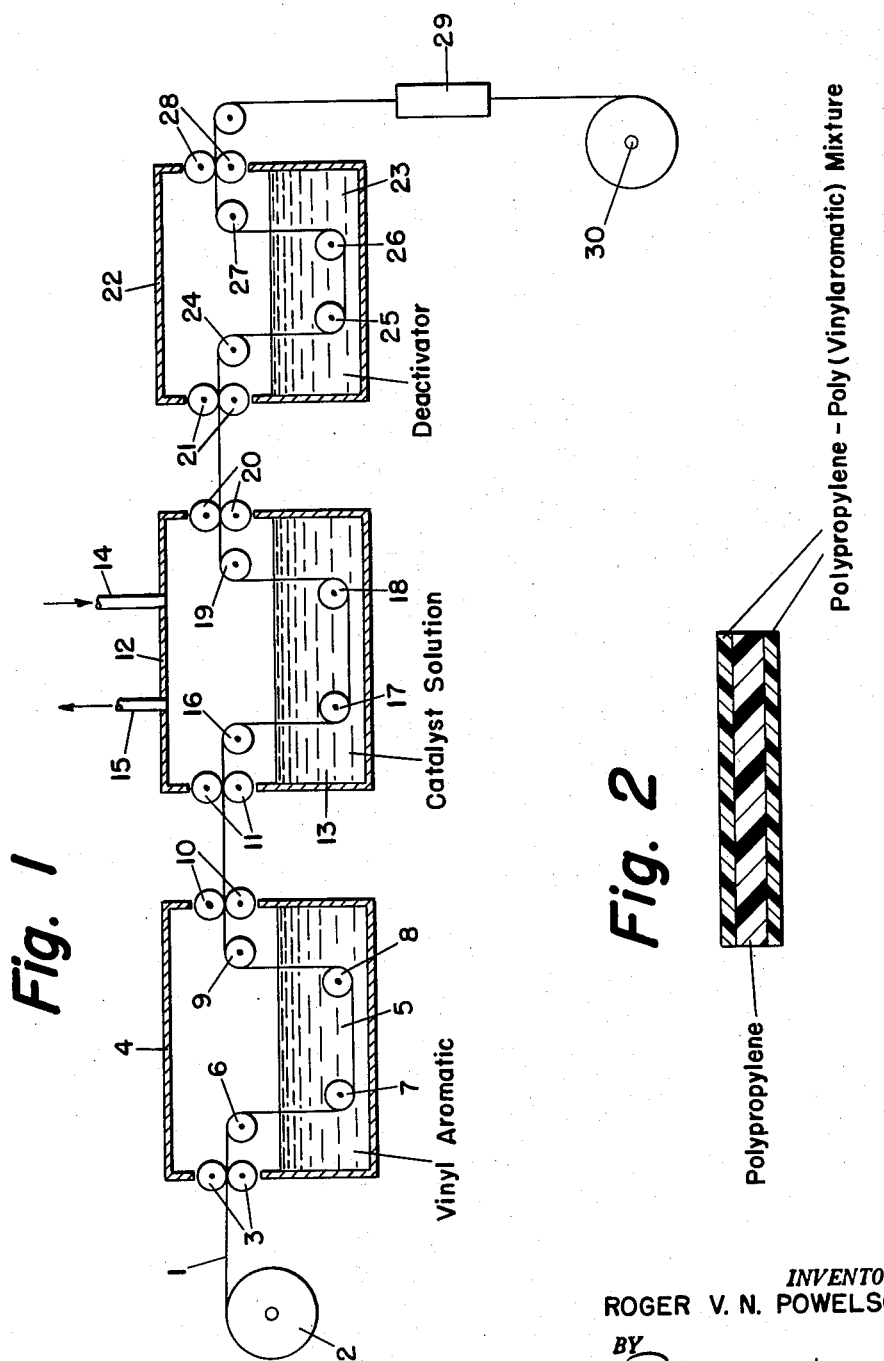

Nov. 12, 1963 R. V. N. POWELSON 3,110,611
HEAT SEALABLE POLYPROPYLENE FILMS
Filed June 7, 1960

INVENTOR.
ROGER V. N. POWELSON
BY Robert O. Spindle
ATTORNEY

3,110,611
HEAT SEALABLE POLYPROPYLENE FILMS
Roger V. N. Powelson, Ambler, Pa., assignor to Sun Oil Company, Philadelphia, Pa., a corporation of New Jersey
Filed June 7, 1960, Ser. No. 34,451
11 Claims. (Cl. 117—62.2)

This invention relates to a method for preparing heat-sealable polypropylene films, and more particularly to a method for physically incorporating a heat-sealable material into the surface of a polypropylene film.

Polypropylene films have the advantage of higher tensile strength and higher surface area per pound than any films currently on the market. They are invariably oriented in the machine direction to some extent during extrusion, however, and this leads to the disadvantage that during heat sealing the film contracts to the unoriented state to produce an unsightly, wrinkled, seal.

Attempts have been made to coat polypropylene films with other heat-sealable materials such as saran or nitrocellulose, but adherence of these materials to the film is poor, resulting in a very weak seal.

It is an object of this invention to provide a method for physically incorporating into the surface of polypropylene film a material which may be heat sealed at a temperature below the relaxation temperature of polypropylene whereby to enable the film to be heat sealed without wrinkling.

It is a further object of my invention to provide, as a new composition of matter, a heat-sealable film material consisting largely of polypropylene.

I have now found that the foregoing objects may be attained by immersing the film in a bath of a vinyl aromatic compound such as styrene, alpha-methyl styrene, or vinyl toluene for a period of time sufficient to swell the film by 5 to 40 percent, and then subjecting the swollen film to the action of a polymerization catalyst whereby to polymerize the vinyl aromatic compound in the film and to form at the surface of the film an intimate mixture of polypropylene and vinyl polymer. Since the vinyl aromatic polymer is in physical admixture with the polypropylene, it cannot be pulled loose therefrom without rupture of the film, and seals made by heat sealing at the fusion point of the aromatic vinyl polymer are as strong as the film itself.

In the swelling step any temperature may be used between room temperature and the boiling point of the vinyl aromatic, but it is preferred to use moderately elevated temperatures, since swelling proceeds more rapidly at elevated temperatures. A small amount of an inhibitor, such as p-tert-butyl catechol, should be present in the aromatic vinyl monomer to prevent any thermal polymerization in the swelling tank.

In the polymerization step any polymerization catalyst known to the art to be effective in the polymerization of vinyl aromatic compounds may be used, such as, for example, Friedel-Crafts compounds or peroxides. I prefer, however, to use as the catalyst aluminum ethyl dichloride, since this compound effects a very rapid polymerization. This catalyst is preferably used as a 5% to 20% solution in a liquid aliphatic hydrocarbon such as hexane, n-heptane, isooctane, or higher saturated aliphatic hydrocarbon. It may also be used without solvent, but this is not preferred due to the high loss of catalyst adherent to the film as it is withdrawn from the catalyst bath. The invention should not, however, be deemed limited to the use of any particular catalyst, since the inventive concept resides in swelling the film with the vinyl aromatic compound, followed by polymerization of the vinyl aromatic compound in the film.

In order that those skilled in the art may more fully understand the nature of my invention and a method for carrying it out, it will be more fully described in connection with the accompanying drawings, in which FIG. 1 is a diagrammatic flow sheet of a method for carrying out the invention, and FIG. 2 is a cross-sectional view of the film product.

One-half mil polypropylene film 1 is drawn from supply roll 2 and is passed by powered rollers 3 into tank 4, which contains a pool of styrene 5 maintained at a temperature of 140° F. In tank 4 the film passes over idler 6, under idlers 7 and 8, located below the surface of the styrene, over idler 9, and is withdrawn from tank 4 by powered rollers 10. Residence time in tank 4 is about three minutes, which causes the film to swell from 0.5 mil to about 0.7 mil. It will be understood, of course, that the degree of swelling can be controlled by control of the residence time of the film in the styrene, or by control of the temperature. For best results from a heat sealing standpoint, the swelling should be controlled so as to increase the gauge of the film by about 0.2 mil to 0.6 mil. Any further increase in film thickness does not increase the bond strength of the heat seal to any significant degree. Thus, for a half mil film, an increase in thickness of 0.2 mil represents a 40% swelling, whereas if a 4 mil film is used, and the thickness of the film is increased to 4.4 mils, only a 10% swelling is involved.

The film is then passed by powered rollers 11 into tank 12, which contains a pool 13 of a 10% solution of aluminum ethyl dichloride in hexane maintained at a temperature of 120° F. The atmosphere over the pool 13 of catalyst solution is maintained free of oxygen by sweeping an inert gas such as nitrogen or flue gas therethrough via inlet line 14 and exit line 15. In tank 13 the film is passed over idler 16 and under idlers 17 and 18, located below the surface of the catalyst solution, over idler 19, and is withdrawn from tank 12 by powered rollers 20. Residence time of the film in tank 12 is not critical, since the styrene is polymerized almost instantaneously with this catalyst.

The film is then pulled by powered rollers 21 into tank 22, which contains a pool 23 of polar material such as methanol, which is capable of destroying any catalyst which may adhere to the surface of the film. In tank 22 the film passes over idler 24, under idlers 25 and 26 located below the level of the methanol, over idler 27, and is withdrawn from tank 22 by powered rolls 28. The film is then passed through dryer 29, and is taken up on roll 30.

The film produced in accordance with the foregoing procedure has the appearance illustrated in FIG. 2 of the drawings, that is, it consists of a base film of polypropylene covered on each side with a mixture of polypropylene and polystyrene. It may be readily heat sealed in the range of 225–300° F., which is well below the relaxation temperature of polypropylene, so that an unwrinkled seal may be obtained. In contrast polypropylene alone requires a heat sealing range of 350–425° F., which is above the relaxation temperature, and unwrinkled heat seals cannot be obtained.

I claim:

1. A process for the preparation of a heat-sealable polypropylene film which comprises swelling polypropylene film with a polymerizable vinyl aromatic compound followed by polymerization of the vinyl aromatic compound in situ in the film.

2. The process according to claim 1 in which the polymerizable vinyl aromatic compound is styrene.

3. A process for the preparation of a heat-sealable polypropylene film which comprises swelling polypropylene film with a polymerizable vinyl aromatic compound and contacting the swollen film with a solution of aluminum ethyl dichloride in an inert hydrocarbon solvent whereby to polymerize the vinyl aromatic compound in situ on the film.

4. The process according to claim 3 in which the vinyl aromatic compound is styrene.

5. A process for the preparation of a heat-sealable polypropylene film which comprises swelling polypropylene film with from 5% to 40% by weight based on the weight of the polypropylene of a polymerizable vinyl aromatic compound followed by polymerization of the vinyl aromatic compound in situ in the film.

6. The process according to claim 5 in which the vinyl aromatic compound is styrene.

7. A process for the preparation of a heat-sealable polypropylene film which comprises swelling polypropylene film with from 5% to 40% by weight based on the weight of the polypropylene of a polymerizable vinyl aromatic compound and contacting the swollen film with a solution of aluminum ethyl dichloride in an inert hydrocarbon solvent whereby to polymerize the vinyl aromatic compound in situ in the film.

8. The process according to claim 7 in which the vinyl aromatic compound is styrene.

9. As a new composition of matter, polypropylene film having a solid polymer of a vinyl aromatic compound incorporated into the surface thereof.

10. A polypropylene film having polystyrene incorporated into the surface thereof.

11. The product according to claim 10 in which the polystyrene forms from 5% to 40% by weight of the film, based on polypropylene.

References Cited in the file of this patent
UNITED STATES PATENTS

| | | |
|---|---|---|
| 2,387,517 | Kraus | Oct. 23, 1945 |
| 2,450,503 | Drummond | Oct. 5, 1948 |
| 2,472,495 | Sparks et al. | June 7, 1949 |
| 2,684,307 | Knapman et al. | July 20, 1954 |
| 2,918,394 | Smith | Dec. 22, 1959 |
| 2,987,501 | Rieke et al. | June 6, 1961 |
| 2,992,133 | Zehrung | June 11, 1961 |